(12) United States Patent
Ogasahara (10) Patent No.: US 9,417,554 B2
(45) Date of Patent: Aug. 16, 2016

(54) IMAGE FORMING APPARATUS AND IMAGE FORMATION METHOD THAT PERFORM SMOOTHING

(71) Applicant: KYOCERA Document Solutions Inc., Osaka (JP)

(72) Inventor: Okito Ogasahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/814,490

(22) Filed: Jul. 30, 2015

(65) Prior Publication Data

US 2016/0033892 A1    Feb. 4, 2016

(30) Foreign Application Priority Data

Jul. 30, 2014    (JP) ................. 2014-155270

(51) Int. Cl.
*G03G 15/00*       (2006.01)
*G03G 15/043*      (2006.01)
*G06K 15/02*       (2006.01)
*H04N 1/409*       (2006.01)

(52) U.S. Cl.
CPC .......... *G03G 15/043* (2013.01); *G06K 15/1843* (2013.01); *G06K 15/1872* (2013.01); *H04N 1/409* (2013.01)

(58) Field of Classification Search
CPC .......... G03G 15/5058; G03G 15/0131; G03G 2215/00059; G03G 15/043; G03G 15/5041; G03G 15/50; G03G 2215/00042; G03G 2215/0161; G03G 15/0194; G03G 15/5025; G03G 15/5062; G03G 15/556; G03G 2215/0164
See application file for complete search history.

(56) References Cited

U.S. PATENT DOCUMENTS 4,437,122 A        3/1984  Walsh et al.
2013/0293928 A1*  11/2013  Kashibuchi ........ G06K 15/1881
                                                    358/3.06
2013/0321550 A1*  12/2013  Tamura ............... H04N 1/40037
                                                    347/112

FOREIGN PATENT DOCUMENTS

JP        2001-309139 A    11/2001
JP        2008-238590 A    10/2008

* cited by examiner

*Primary Examiner* — Roy Y Yi
(74) *Attorney, Agent, or Firm* — Hawaii Patent Services; Nathaniel K. Fedde; Kenton N. Fedde

(57) ABSTRACT

Provided is an image forming apparatus that performs smoothing in conversion of pseudo high resolution without using a large translation table. A smoothing process part performs smoothing based on a density of a peripheral pixel that adjoins a target pixel on edge. When a density change between both sides of the target pixel in a sub scanning direction is larger than a density change between both sides of the target pixel in a main scanning direction, a density of a plurality of pixels after conversion of pseudo high resolution of a sub scanning direction corresponding to the target pixel is mutually changed. Also, when a density change between both sides of target pixel in the sub scanning direction is not larger than a density change between both sides of the target pixel in the main scanning direction, the density set to the same.

6 Claims, 8 Drawing Sheets

IMAGE FORMING APPARATUS AND IMAGE FORMATION METHOD THAT PERFORM SMOOTHING

INCORPORATION BY REFERENCE

This application is based on and claims the benefit of priority from Japanese Patent Application No. 2014-155270 filed on Jul. 30, 2014, the contents of that are hereby incorporated by reference.

BACKGROUND

The present disclosure is related with an image forming apparatus and an image formation method.

An image forming apparatus has print engine, which can print with high resolution, such as 1200 dpi (dot per inch.) In this case, when rasterizing process of image data is performed with high resolution, an amount of data after rasterizing process becomes large. Thus, processing time increases, and latency time to start a print operation is long.

Thus, there is a pseudo high resolution technology. In this case, a rasterizing process is performed in a low resolution, such as 600 dpi. Then, a screen process is performed to image data of the low resolution. After that, it converts into image data of high resolution (for example, 1200 dpi,) that is printable with print engine. Thereby, smoothing of edge is performed. There are effects, such as reduction of a jaggy of edge of a character, or the like, stabilization of a gradation characteristic, and reduction of moiré. In a typical apparatus, pattern matching is used to the image before smoothing, and a pixel value after smoothing is determined.

SUMMARY

An image forming apparatus related to the present disclosure includes a smoothing process part and an exposure controlling part. The smoothing process part performs a smoothing process based on a density of a peripheral pixel that adjoins a target pixel on edge. The smoothing process part, when a density change between both sides of the target pixel in a scanning direction is larger than a density change between both sides of the target pixel in a main scanning direction, mutually changes a density of a plurality of pixels after conversion of pseudo high resolution in the sub scanning direction corresponding to the target pixel. Also, the smoothing process part, when the density change between both sides of the target pixel in the sub scanning direction is not larger than the density change between both sides of the target pixel in the main scanning direction, sets the same density for the density of the plurality of pixels after conversion of pseudo high resolution in the sub scanning direction corresponding to the target pixel. Also, the exposure controlling part, based on the density of the plurality of pixels after the conversion of pseudo high resolution obtained by the smoothing process part, performs exposure control about the plurality of pixels after conversion of pseudo high resolution. An image formation method related to the present disclosure is performed based on a density of a peripheral pixel that adjoins a target pixel on edge. When a density change between both sides of the target pixel in a sub scanning direction is larger than a density change between both sides of the target pixel in a main scanning direction, a density of a plurality of pixels after conversion of pseudo high resolution in the sub scanning direction corresponding to the target pixel is mutually changed. When the density change between both sides of the target pixel in the sub scanning direction is not larger than the density change between both sides of the target pixel in the main scanning direction, set the same density for the density of the plurality of pixels after conversion of pseudo high resolution in the sub scanning direction corresponding to the target pixel. Based on the obtained density of the plurality of pixels after conversion of pseudo high resolution, exposure control about the plurality of pixels after conversion of pseudo high resolution is performed.

DETAILED DESCRIPTION

Hereinafter, an embodiment of the present disclosure is explained based on drawing.

Embodiment 1

Figure 1:
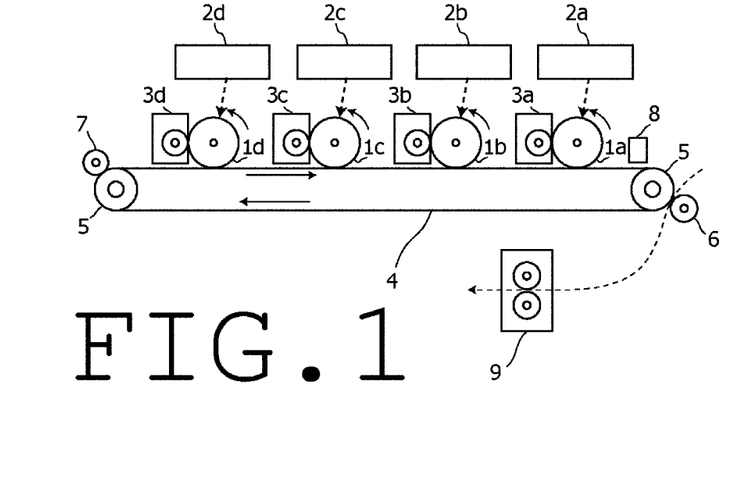
FIG. 1 is a side view showing a part of mechanical internal configuration of an image forming apparatus related to an embodiment of the present disclosure.

FIG. 1 is a side view showing a part of mechanical internal configuration of an image forming apparatus related to the embodiment of the present disclosure. The image forming apparatus is an apparatus that has a print function of an electrophotographying system, such as a printer, a facsimile apparatus, a copying machine, and an MFP (Multifunction Peripheral.)

The image forming apparatus of this embodiment has a color development device in a tandem type. This color development device has photo conductor drums $1a$-$1d$, exposure devices $2a$-$2d$, and development units $3a$-$3d$. Photo conductor drums $1a$-$1d$ are photo conductors of 4 colors, which are cyan, magenta, yellow, and black. Exposure devices $2a$-$2d$ are device that irradiate with a laser beam to photo conductor drums $1a$-$1d$ and form electrostatic latent images. Exposure devices $2a$-$2d$ have a laser diode that is a light source of a laser beam and optical elements (a lens, a mirror, a polygon mirror, or the like) that lead the laser beam to photo conductor drums $1a$-$1d$.

Further, in circumference of photo conductor drums $1a$-$1d$, charging devices, such as scorotron, a cleaning device, a charge neutralizer, or the like, are arranged. The cleaning device removes residual toner on photo conductor drum $1a$-$1d$ after primary transfer, and the charge neutralizer discharges photo conductor drums $1a$-$1d$ after primary transfer.

Development units $3a$-$3d$ equip toner cartridges filling up toners of 4 colors, which are cyan, magenta, yellow, and black, respectively. Also, the toner is supplied from the toner cartridge. The toner configures a developing powder with a carrier. Development units 3a-3d make the toner adhere to an electrostatic latent image on photo conductor drum 1a-1d and form a toner image.

Development of magenta is performed by photo conductor drum 1a, exposure device 2a, and development unit 3a. Development of cyan is performed by photo conductor drum 1b, exposure device 2b, and development unit 3b. Development of yellow is performed by photo conductor drum 1c, exposure device 2c, and development unit 3c. Development of black is performed by photo conductor drum 1d, exposure device 2d, and development unit 3d.

Intermediate transfer belt 4 contacts photo conductor drums 1a-1d. Intermediate transfer belt 4 is cylindrical image carrier for primary transfer in the toner image on photo conductor drum 1a-1d. Intermediate transfer belt 4 is stretched to be laid by driving roller 5. Intermediate transfer belt 4 goes around to a direction from a contact position with photo conductor drum 1d to the contact position with photo conductor drum 1a. This is based on driving force by driving roller 5.

Transfer roller 6 contacts a conveyed paper to intermediate transfer belt 4. Then, transfer roller 6 secondary transfers the toner image on intermediate transfer belt 4 to the paper. In addition, the paper, which is transferred the toner image, is conveyed to fixing device 9. Then, the toner image is fixed to the paper.

Roller 7 has a cleaning brush. Roller 7 contacts a cleaning brush to intermediate transfer belt 4. Roller 7 removes a toner remained in intermediate transfer belt 4 after transferring the toner image to the paper.

Sensor 8 is a sensor used for toner density adjustment. Sensor 8 irradiates light to intermediate transfer belt 4 and detects the reflected light. In the case of toner density adjustment, sensor 8 irradiates light to a specified area of intermediate transfer belt 4 and detects the reflected light of light (measuring beam.)
Sensor 8 outputs electric information according to the quantity of light.

Figure 2:
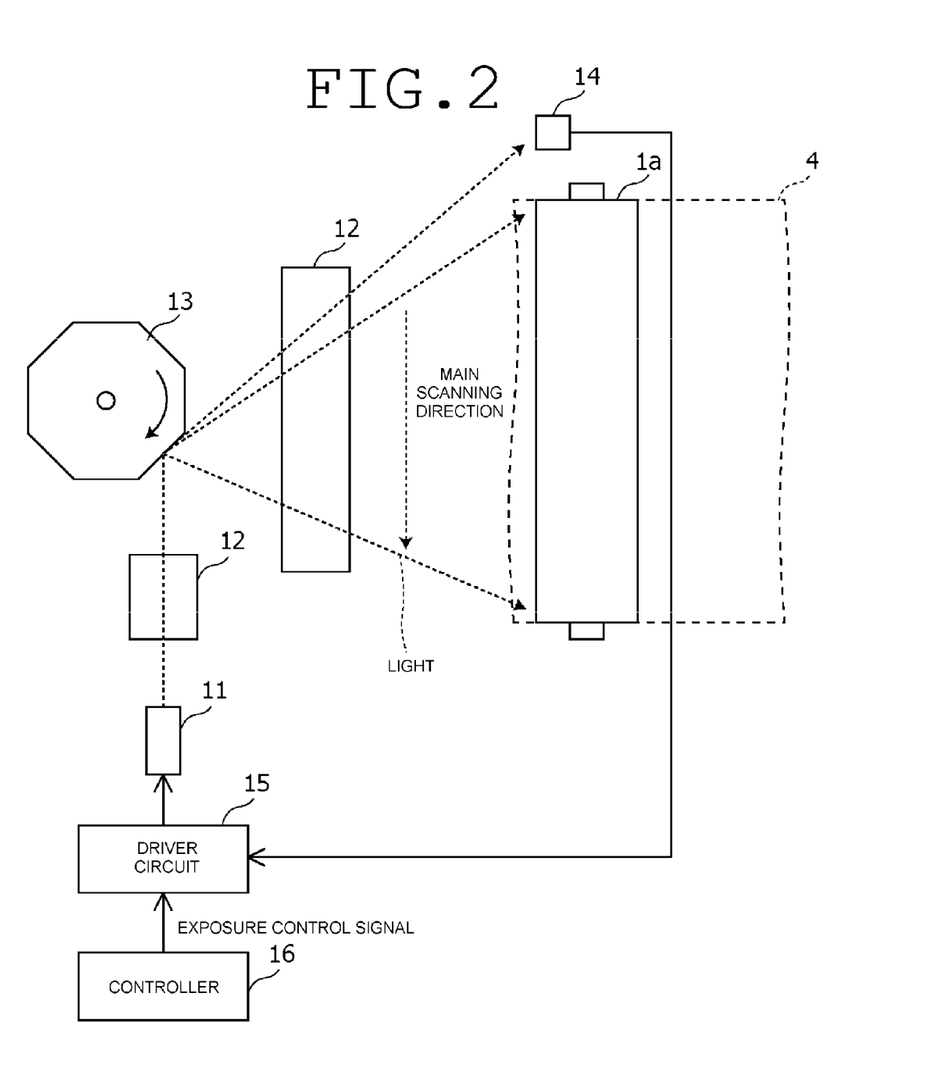
FIG. 2 is a diagram showing an example of a configuration of an exposure device in FIG. 1.

FIG. 2 is a figure showing an example of a configuration for exposure devices 2a-2d in FIG. 1. The exposure device shown in FIG. 2 is exposure device 2a for photo conductor drums 1a. Each of exposure devices 2b-2d for photo conductor drum 1b-1d has also a similar configuration.

In FIG. 2, exposure device 2a has laser diode 11, optical system 12, polygon mirror 13, PD sensor 14, driver circuit 15, and controller 16.

Laser diode 11 is a light source that emits a laser beam. Optical systems 12 are various lens groups arranged from laser diode 11 to polygon mirror 13 and/or from polygon mirror 13 to photo conductor drum 1a and PD (Photo Diode) sensor 14. The f-theta lens, or the like, are used for optical system 12.

Also, polygon mirror 13 has a perpendicular axis toward an axis of photo conductor drum 1a. Polygon mirror 13 is an element where cross section perpendicular to the axis is a polygon and the side is a mirror. Polygon mirror 13 rotates centering on the axis. Then, polygon mirror 13 scans light emitted from laser diode 11 along an axial direction (main scanning direction) of photo conductor drum 1a.

Also, PD sensor 14 is a sensor that receives light scanned by polygon mirror 13 in order to generate a scanning synchronization signal. PD sensor 14 induces output voltage according to the quantity of light when light incident. PD sensor 14 is arranged in a specified position on a line where light is scanned. PD sensor 14 is used in order to detect timing to which a spot of light passes through the position.

Also, driver circuit 15 controls laser diode 11 according to an exposure control signal in synchronization of a main scanning direction by using output of PD sensor 14.

Controller 16 shown in FIG. 2 generates an exposure control signal about exposure devices 2a-2d for each color and supplies it to driver circuit 15. Controller 16 configures a computer, ASIC (Application Specific Integrated Circuit,) or the like.

Figure 3:
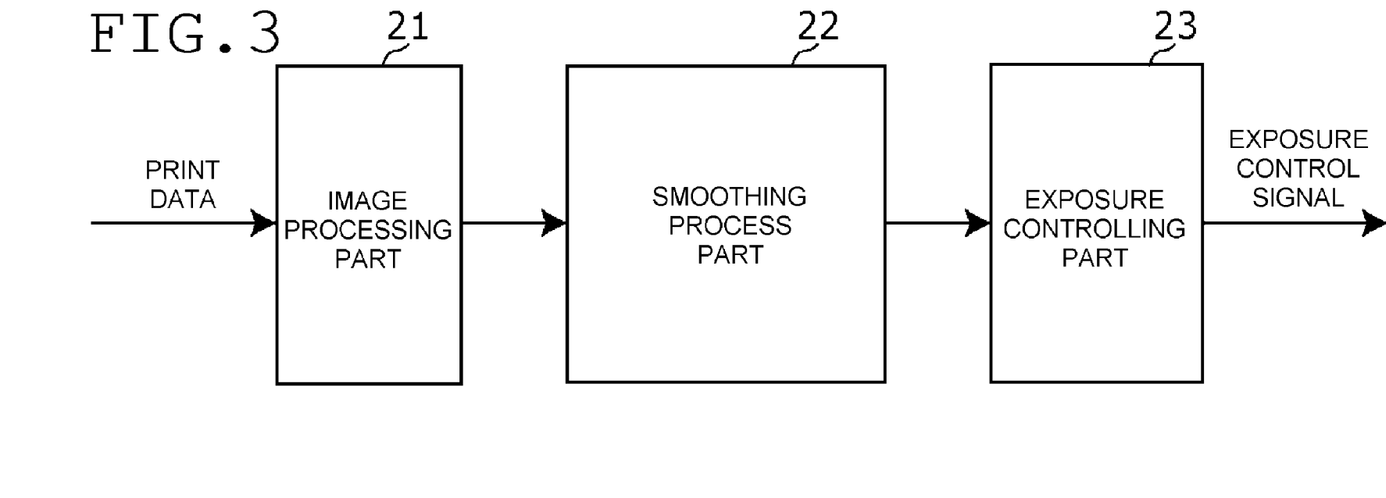
FIG. 3 is a block diagram showing an example of a configuration of controller 16 in FIG. 2.

FIG. 3 is a block diagram showing an example of a configuration of controller 16 in FIG. 2. Controller 16 includes image processing part 21, smoothing process part 22, and exposure controlling part 23 in FIG. 3.

Image processing part 21 analyzes print data supplied from a host device. Image processing part 21 generates raster image data in specified resolution. Image processing part 21 performs image processing, such as convert colors and a screen process, to generated raster image data.

Smoothing process part 22 performs smoothing of edge by using pseudo high resolution to image data after image processing by image processing part 21.

Smoothing process part 22 performs smoothing based on a density of a peripheral pixel that adjoins a target pixel on edge. Smoothing process part 22, when a density change between both sides of a target pixel in a sub scanning direction is larger than a density change between both sides of the target pixel in a main scanning direction, mutually changes a density of a plurality of pixels after conversion of pseudo high resolution in the sub scanning direction corresponding to the target pixel. Smoothing process part 22, when the density change between both sides of the target pixel in the sub scanning direction is not larger than the density change between both sides of the target pixel in the main scanning direction, sets the same density for the density of the plurality of pixels after conversion of pseudo high resolution in the sub scanning direction corresponding to the target pixel.

According to Embodiment 1, smoothing process part 22 derives, based on the density of the pixel that adjoins both sides of the target pixel in the sub scanning direction and the density of the target pixel, the density of the plurality of pixels after conversion of pseudo high resolution in the sub scanning direction corresponding to the target pixel.

Figure 4:
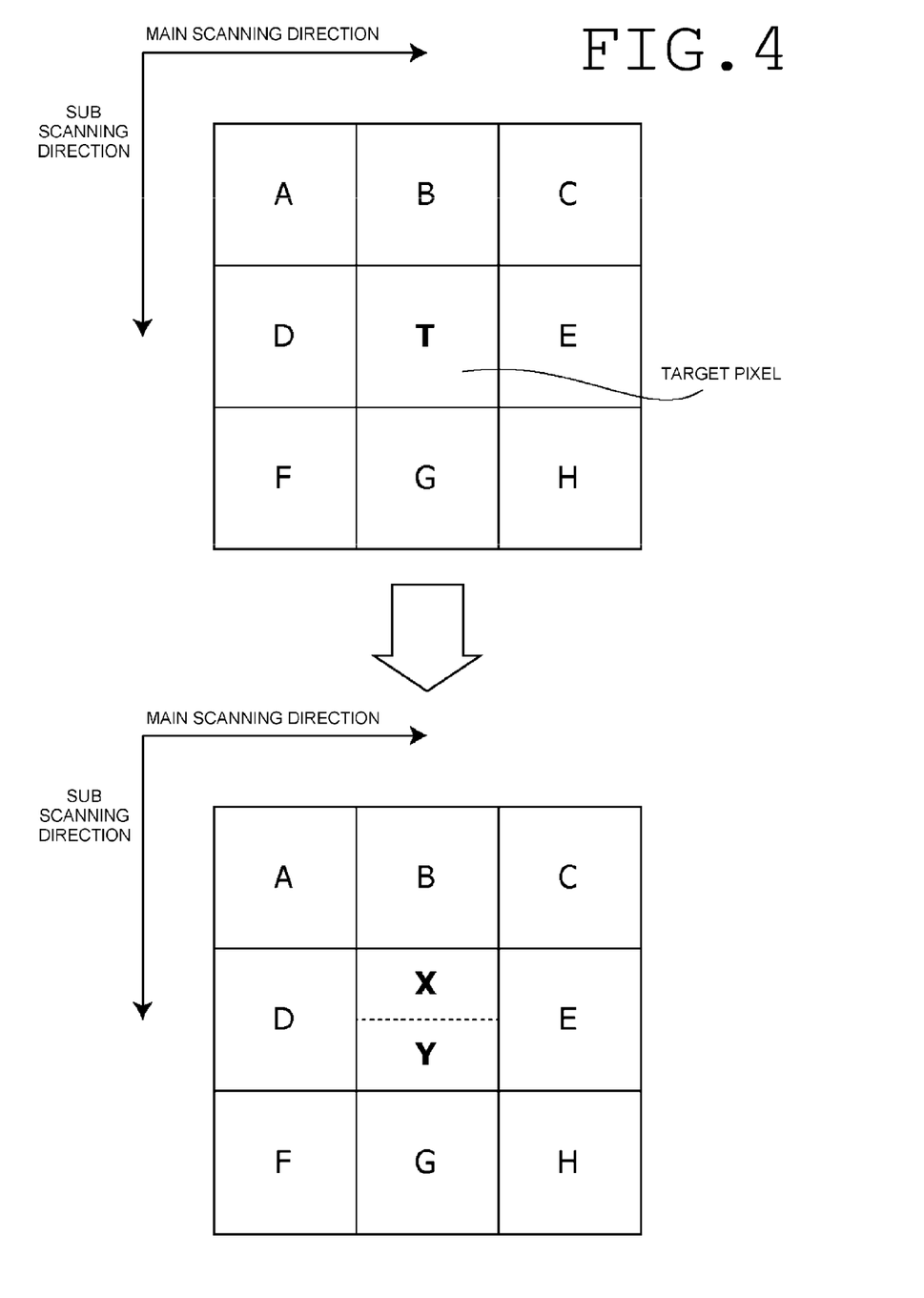
FIG. 4 is a diagram showing a target pixel in smoothing by a smoothing process part in FIG. 3, and a peripheral pixel used for smoothing of a target pixel.

FIG. 4 is a figure showing the target pixel in smoothing and the peripheral pixel used for smoothing of the target pixel by using the smoothing process part in FIG. 3.

In FIG. 4, T shows a density (pixel value) of the target pixel. X and Y show a density of two pixels after conversion of pseudo high resolution in the sub scanning direction corresponding to the target pixel. A shows a density (pixel value) of a pixel that is a position at −1 pixels in the main scanning direction and is at −1 pixel in the sub scanning direction from a target pixel. B shows a density (pixel value) of a pixel that is the same position in the main scanning direction and is at −1 pixel position in the sub scanning direction from the target pixel. C shows a density (pixel value) of a pixel that is at +1 pixel in the main scanning direction and is at −1 pixel position in the sub scanning direction from the target pixel. D shows a density (pixel value) of a pixel that is the same position in the sub scanning direction and is at −1 pixel position in the main scanning direction from the target pixel. E shows a density (pixel value) of a pixel that is the same position in the sub scanning direction and is at +1 pixel position in the main scanning direction from the target pixel. F shows a density (pixel value) of a pixel that is at −1 pixels position in the main scanning direction and is at +1 pixel position in the sub scanning direction from the target pixel. G shows a density (pixel value) of a pixel that is the same position in the main scanning direction and is at +1 pixel position in the sub scanning direction from the target pixel. H shows a density (pixel value) of a pixel that is at +1 pixel position in the main scanning direction and is at +1 pixel position in the sub scanning direction from the target pixel.

Here, |(A+B+C)−(F+G+H)| is a density change between both sides of the target pixel in the main scanning direction, |(A+D+F)−(C+E+H)| is a density change between both sides of the target pixel in the sub scanning direction.

Also, as shown in FIG. 4, based on the target pixel and the density of 8 pixels in the circumference, a density of two pixels after conversion of pseudo high resolution in the sub scanning direction corresponding to the target pixel is derived here. For this reason, smoothing process part 22 has a line memory for three lines. Smoothing process part 22 selects a target pixel in order on a central line. Smoothing process part 22 determines the density of two pixels after conversion of pseudo high resolution about the selected target pixel. When completing a process about one line, smoothing process part 22 shifts one line at a time for the image data in the line memory. Smoothing process part 22 executes the same process in the next line after that.

Exposure controlling part 23 performs exposure control about the plurality of pixels after conversion of pseudo high resolution. This exposure control is based on the density of the plurality of pixels after conversion of the pseudo high resolution, which is obtained by smoothing process part 22. In this exposure control, exposure controlling part 23 generates an exposure control signal that specifies a pixel exposed with laser diode 11 for each color. Exposure controlling part 23 can specify exposure period with laser diode 11 in a scanning interval for 1 pixel by using the exposure control signal.

In Embodiment 1, exposure controlling part 23 controls exposure period according to the density of the pixel that adjoins both sides of the target pixel in the main scanning direction. Exposure controlling part 23 put close exposure period to that of a pixel where the density of the pixels of both sides is higher. The exposure period here is for the plurality of pixels after conversion of pseudo high resolution in the sub scanning direction corresponding to the target pixel.

Figure 5:
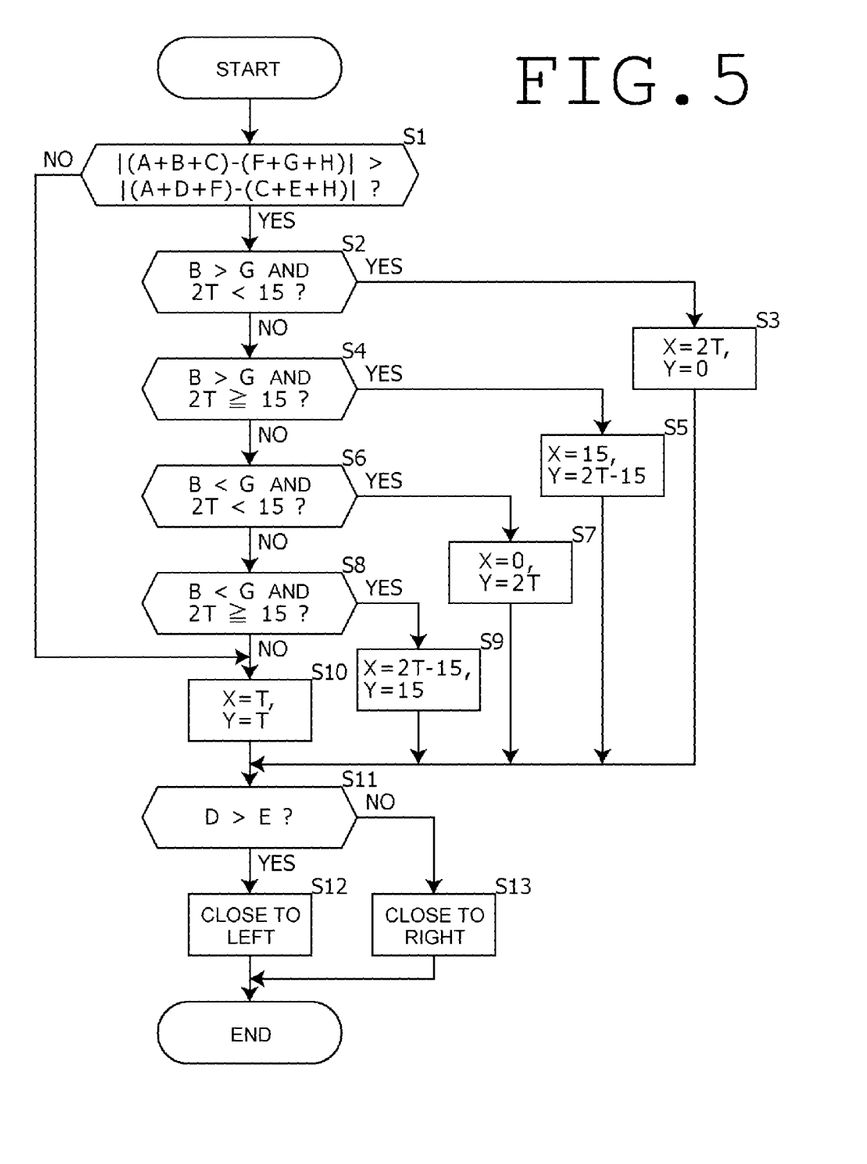
FIG. 5 is a flow chart explaining for smoothing in the image forming apparatus related to embodiment 1.

Then, operation of the above-mentioned image forming apparatus is explained. FIG. 5 is a flow chart to explain smoothing in the image forming apparatus related to Embodiment 1.

Here, as an example, a case where image data after a process by image processing part 21 is 4 bits per pixel data is explained.

Smoothing process part 22, in an image (for example, a character and a line drawing image) to be printed, selects the target pixel from a head in the main scanning direction and the sub scanning direction along the main scanning direction. Smoothing process part 22, after performing pseudo high resolution for one line, in the next line, selects along the main scanning direction. In the following, smoothing process part 22 carries out pseudo high resolution about each line to order.

Smoothing process part 22 executes the following processes about each target pixel.

Firstly, smoothing process part 22 calculates density change D1 between both sides of the target pixel in the main scanning direction (=|(A+D+F)−(C+E+H)|) and density change D2 between both sides of the target pixel in the sub scanning direction (=|(A+B+C)−(F+G+H)|), and it determines whether or not density change D2 in the sub scanning direction is larger than density change D1 in the main scanning direction (Step S1).

When density change D2 in the sub scanning direction is larger than density change D1 in the main scanning direction, smoothing process part 22, based on density T of the target pixel and densities B and G of two pixels that adjoins the target pixel in the sub scanning direction, determines densities X and Y of two pixels after conversion of pseudo high resolution (Steps S2-S9). On the other hand, when density change D2 in the sub scanning direction is not larger than density change D1 in the main scanning direction, smoothing process part 22 sets densities X and Y of two pixels after conversion of pseudo high resolution to the same as that of density T of the target pixel (Step S10).

In detail, (a1) if twice the value of density T of the target pixel is smaller than maximum density (=15) (Steps S2 and S6), or (b1) if, in two pixels adjoining the target pixel in the sub scanning direction, density B of a pixel on the back side of the target pixel is larger than density G of a pixel on the front side of the target pixel (Step S2), in two pixels after conversion of pseudo high resolution, density X of the pixel on the back side is set to twice the value of density T of the target pixel in the sub scanning direction. Also, density Y of the pixel on the front side in the sub scanning direction is set to zero (Step S3). (b2) If, in two pixels adjoining the target pixel in the sub scanning direction, density B of the pixel on the back side of the target pixel is smaller than density G of the pixel on the front side of the target pixel (Step S6), in two pixels after conversion of pseudo high resolution, density X of the pixel on the back side in the sub scanning direction is set to zero. Also, density Y of the pixel on the front side in the sub scanning direction is set to twice the value of pixel value T of the target pixel (Step S7).

On the other hand, (a2) if twice the value of density T of the target pixel is greater than or equal to maximum density (=15) (Steps S4 and S8), (b3) if, in two pixels adjoining the target pixel in the sub scanning direction, density B of the pixel on the back side of the target pixel is larger than density G of the pixel on the front side of the target pixel (Step S4), in two pixels after conversion of pseudo high resolution, density X of the pixel on the back side in the sub scanning direction is set to maximum density (=15). Also, density Y of the pixel of the front side in the sub scanning direction is set to value subtracted maximum density from twice the value of density T of the target pixel (Step S5), (b4) if, in two pixels adjoining the target pixel in the sub scanning direction, density B of the pixel on the back side of the target pixel is smaller than density G of the pixel on the front side of the target pixel, it is (Step S8), in two pixels after conversion of pseudo high resolution, density X of the pixel on the back side in the sub scanning direction is set to the value subtracted maximum density from twice the value of density T of the target pixel. Also, density Y of the pixel on the front side in the sub scanning direction is set to maximum density (=15) (Step S9).

In addition, even if density change D2 in the sub scanning direction is larger than density change D1 in the main scanning direction, in case that density T of the target pixel and densities B and G of two pixels adjoining the target pixel in the sub scanning direction are the same, exceptionally, it is considered that density change D2 of the sub scanning direction is smaller than density change D1 in the main scanning direction. Then, smoothing process part 22 sets densities X and Y of two pixels after conversion of pseudo high resolution to the same as that of density T of the target pixel (Step S10). This is the same as the case where density change D2 in the sub scanning direction is not larger than density change D1 in the main scanning direction.

Thereby, after determining densities X and Y of two pixels after conversion of pseudo high resolution, smoothing process part 22 determines exposure period of densities X and Y of two pixels after conversion of pseudo high resolution.

Firstly, it is determined, in two pixels adjoining the target pixel in the main scanning direction, whether or not density D of a pixel on the back side is larger than density E of a pixel on the front side (Step S11). If, in the two pixels adjoining the target pixel in the main scanning direction, density D of the pixel on the back side is larger than density E of the pixel on the front side, smoothing process part 22 sets exposure period of densities X and Y of two pixels after conversion of pseudo high resolution to a position close to the backside in the main scanning direction (left side in FIG. 4) (Step S12). On the other hand, in two pixels adjoining the target pixel in the main scanning direction, if density D of the pixel on the back side is not larger than density E of the pixel on the front side, smoothing process part 22 sets exposure period of densities X and Y of two pixels after conversion of pseudo high resolution to a position (right side in FIG. 4) close to the front side in the main scanning direction (Step S13). In addition, the length of the exposure period of a certain pixel can be set, for example, (density of the pixel)/(maximum density)×(exposure time of maximum density).

Then, exposure controlling part 23 makes exposure device 2 expose in the exposure period determined by smoothing process part 22.

Example 1

Figure 6:
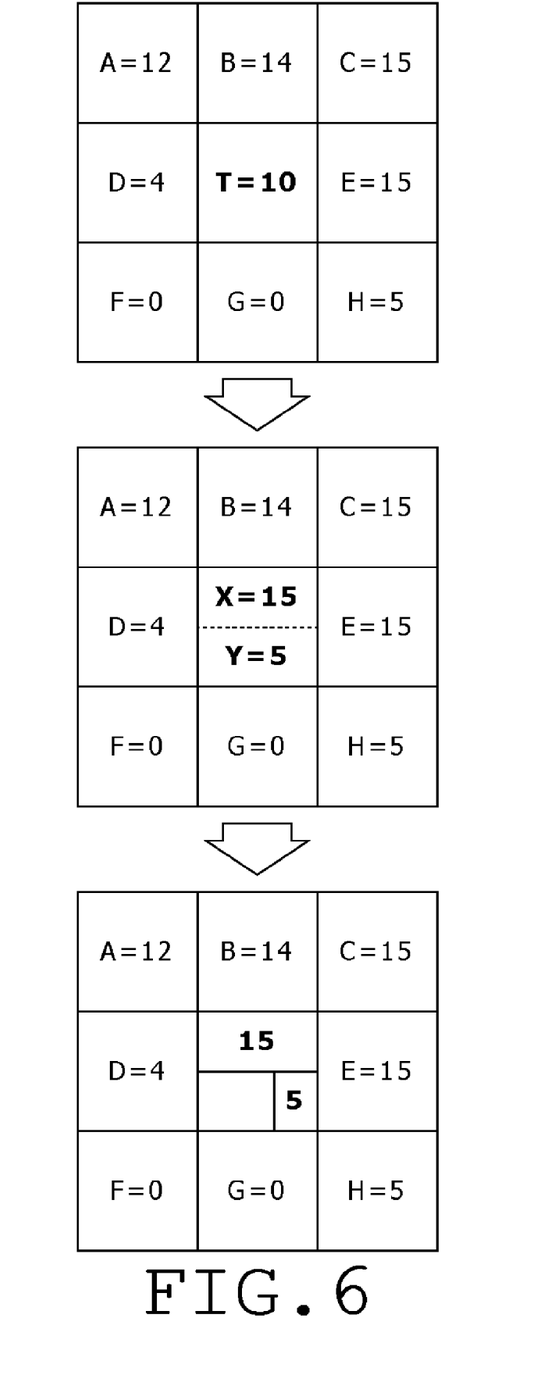
FIG. 6 is a diagram showing an example of smoothing in the image forming apparatus related to embodiment 1.

FIG. 6 is the figure showing an example of smoothing in the image forming apparatus related to Embodiment 1.

For example, in a case shown in FIG. 6, density change D1 in the main scanning direction is 19 (=|(12+4+0)−(15+15+5)|), density change D2 in the sub scanning direction is 36 (=|(12+14+15)−(0+0+5)|), and density change D2 in the sub scanning direction is larger than density change D1 in the main scanning direction (Step S1).

Also, since density B (=14) of the pixel on the back side in the sub scanning direction, is larger than density G (=0) of the pixel in the front side in the sub scanning direction, in addition that twice the value of value T of the target pixel (=20) is greater than or equal to maximum density (=15) (Step S4), in the two pixels after conversion of pseudo high resolution, density X of the pixel on the backside in the sub scanning direction is set to maximum density (=15), and density Y of the pixel on the front side in the sub scanning direction set to a value (=5) that is subtracted maximum density (=15) from twice the value of value T (=20) of the target pixel (Step S5).

Then, since density D of the pixel on the backside in the main scanning direction is not larger than density E of a pixel on the front side in the main scanning direction (Step S11), exposure time of two pixels after conversion of pseudo high resolution is close to the front side in the main scanning direction (Step S13).

Example 2

Figure 7:
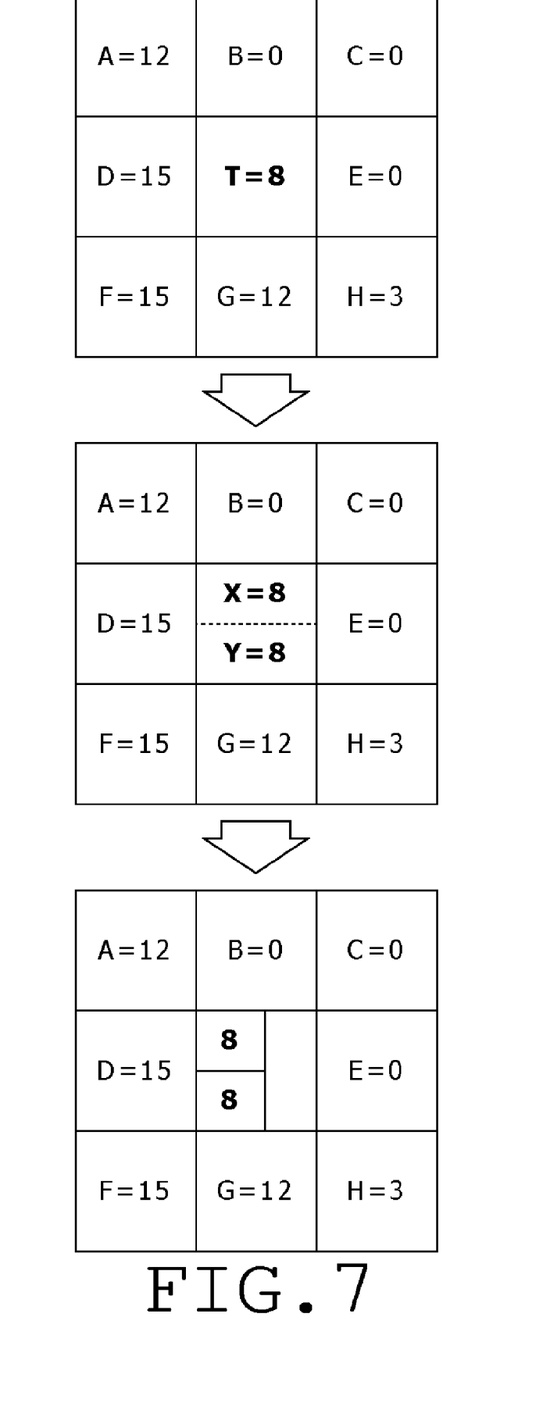
FIG. 7 is a diagram showing another example of smoothing in the image forming apparatus related to embodiment 1.

FIG. 7 is a figure showing another example of smoothing in an image forming apparatus related to Embodiment 1.

For example, in a case shown in FIG. 7, density change D1 in the main scanning direction is 39 (=|(12+15+15)−(0+0+3)|), density change D2 in the sub scanning direction is 18 (=|(12+0+0)−(15+12+3)|), and density change D2 in the sub scanning direction is not larger than density change D1 in the main scanning direction (Step S1).

Therefore, both the densities X and Y of two pixels after conversion of pseudo high resolution are set as the same as that of value T of the target pixel (=8) (Step S10).

Then, since density D of a pixel on the back side in the main scanning direction is larger than density E of a pixel on the front side in the main scanning direction (Step S11), exposure time of two pixels after conversion of pseudo high resolution is close to the backside in the main scanning direction (Step S12).

As mentioned above, according to the above-mentioned Embodiment 1, smoothing process part 22 performs a comparatively simple operation without pattern matching, and density of a plurality of pixels after conversion of the pseudo high resolution corresponding to the target pixel is determined by the pixel value of the target pixel and the peripheral pixel. Accordingly, smoothing is performed without using a large translation table in conversion of pseudo high resolution. Therefore, it becomes unnecessary to have a storage device for a translation table, and cost of the apparatus becomes lower.

Embodiment 2

In the image forming apparatus related to Embodiment 2, smoothing process part 22, based on a density of a peripheral pixel adjoining a target pixel on edge, even if a density change between both sides of the target pixel in a sub scanning direction is larger than a density change between both sides of the target pixel in a main scanning direction, in case that a difference of a density change between both sides of the target pixel in the sub scanning direction and a density change between both sides of the target pixel in the main scanning direction is smaller than a specified value, set a density of a plurality of pixels after conversion of pseudo high resolution in the sub scanning direction corresponding to the target pixel to the same density.

That is, in Embodiment 2, if the density change between the both sides of the target pixel in the sub scanning direction is only a little larger as compared with the density change between the both sides of the target pixel in the main scanning direction, smoothing is not performed, substantially.

Since the other components in Embodiment 2. are the same as those in Embodiment 1, the explanation is omitted.

Figure 8:
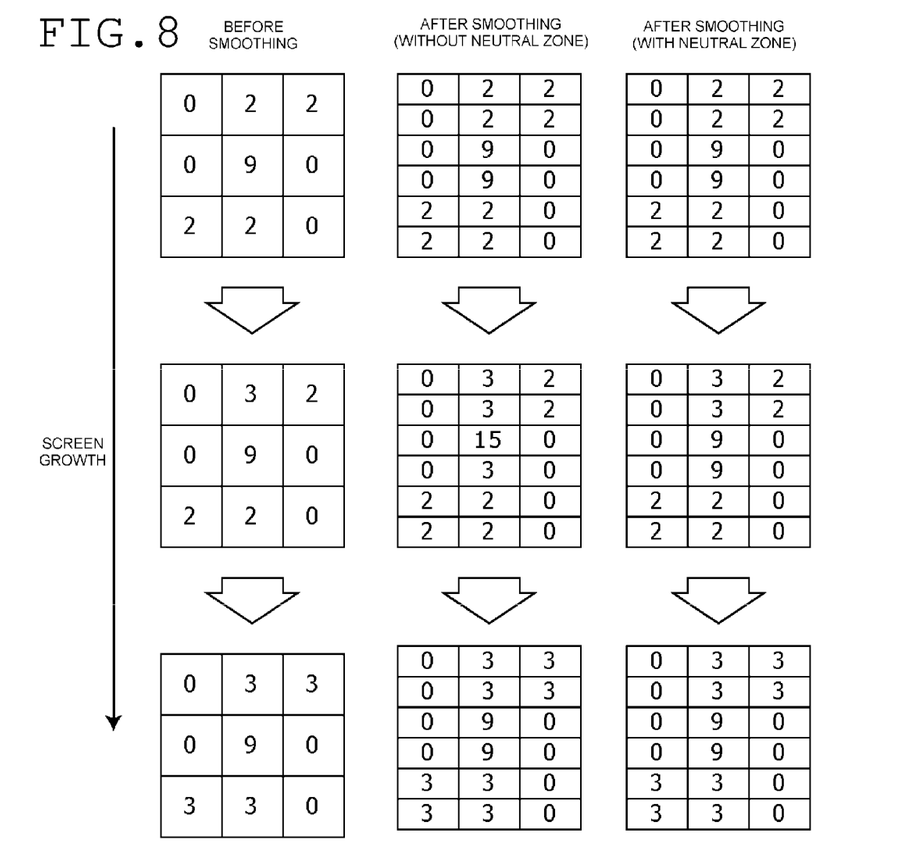
FIG. 8 is a diagram showing an example of smoothing in the image forming apparatus related to embodiment 2.

FIG. 8 is the figure showing an example of smoothing in the image forming apparatus related to Embodiment 2.

In FIG. 8, an example is shown that, if the density change between the both sides of the target pixel in a sub scanning direction is larger than the density change between the both sides of the target pixel in a main scanning direction, the pixel value of two pixels after conversion of pseudo high resolution makes differ. Thereby, as a screen pattern, when growing up a screen with increasing in a density, in some part in densities, image after the conversion of pseudo high resolution may be unnatural.

Therefore, a neutral zone is provided in Embodiment 2. Then, when the difference of the density change between both sides of the target pixel in the sub scanning direction and the density change between both sides of the target pixel in the main scanning direction is smaller than a specified value (that is, width of the neutral zone), it is made not to perform process to differ the density of the plurality of pixels after conversion of pseudo high resolution is the sub scanning direction. Thereby, the image deterioration occurred in a specific screen pattern by the conversion of pseudo high resolution in some densities at the time of screen growth is avoidable.

As mentioned above, according to the above-mentioned Embodiment 2, image deterioration by above-mentioned conversion of pseudo high resolution is avoidable by providing a neutral zone in conditions of the density change.

Although each above-mentioned embodiments are preferred examples of the present disclosure, the present disclosure is not limited to these. Then, in a range that does not deviate from an outline of the present disclosure, various modification and alteration are possible.

As industrial applicability, for example, the present disclosure is applicable to an image forming apparatus of an electrophotographying system.

What is claimed is:

1. An image forming apparatus comprising:
a smoothing process part that, based on a density of a peripheral pixel adjoining a target pixel on edge, when a density change between both sides of the target pixel in a sub scanning direction is larger than a density change between both sides of the target pixel in a main scanning direction, mutually changes a density of a plurality of pixels after conversion of pseudo high resolution in the sub scanning direction corresponding to the target pixel, and when a density change between both sides of the target pixel in the sub scanning direction is not larger than a density change between both sides of the target pixel in the main scanning direction, sets same density for the density of the plurality of pixels after conversion of pseudo high resolution in the sub scanning direction corresponding to the target pixel; and
an exposure controlling part that performs, based on the density of the plurality of pixels after conversion of pseudo high resolution obtained by the smoothing process part, exposure controls about the plurality of pixels after conversion of pseudo high resolution,
wherein:
the smoothing process part, based on the density of the peripheral pixel adjoining the target pixel on edge, even in case that the density change between both sides of the target pixel in the sub scanning direction is larger than the density change between both sides of the target pixel in the main scanning direction, when a difference of the density change between both sides of the target pixel in the sub scanning direction and the density change between both sides of the target pixel in the main scanning direction is smaller than a specified value, sets the same density for the density of the plurality of pixels after conversion of pseudo high resolution in the sub scanning direction corresponding to the target pixel.

2. The image forming apparatus according to claim 1, wherein:
the exposure controlling part, according to the density of the pixel adjoining both sides of the target pixel in the main scanning direction, closes exposure period of the plurality of pixels after conversion of pseudo high resolution in the sub scanning direction corresponding to the target pixel to one side of both sides of the plurality of pixels.

3. The image forming apparatus according to claim 1, wherein:
the smoothing process part derives, based on a density of a pixel adjoining both sides of the target pixel in the sub scanning direction and a density of the target pixel, the density of the plurality of pixels after conversion of pseudo high resolution in the sub scanning direction corresponding to the target pixel.

4. An image formation method comprising the steps of:
mutually changing, based on a density of a peripheral pixel that adjoins a target pixel on edge, when a density change between both sides of the target pixel in a sub scanning direction is larger than a density change between both sides of the target pixel in a main scanning direction, a density of a plurality of pixels after conversion of pseudo high resolution in the sub scanning direction corresponding to the target pixel;
setting the same density, when a density change between both sides of the target pixel in the sub scanning direction is not larger than a density change between both sides of the target pixel in the main scanning direction, for the density of the plurality of pixels after conversion of pseudo high resolution in the sub scanning direction corresponding to the target pixel, wherein based on the density of the peripheral pixel that adjoins the target pixel on edge, even in case that the density change between both sides of the target pixel in the sub scanning direction is larger than the density change between both sides of the target pixel in the main scanning direction, when a difference of the density change between both sides of the target pixel in the sub scanning direction and the density change between both sides of the target pixel in the main scanning direction is smaller than a specified value, the same density is set for the density of the plurality of pixels after conversion of pseudo high resolution in the sub scanning direction corresponding to the target pixel; and
performing exposure control, based on obtained density of the plurality of pixels after conversion of pseudo high resolution, the plurality of pixels after conversion of pseudo high resolution.

5. The image forming image method according to claim 4, further comprising closing, according to the density of the pixel adjoining both sides of the target pixel in the main scanning direction, an exposure period of the plurality of pixels after conversion of pseudo high resolution in the sub scanning direction corresponding to the target pixel to one side of both sides of the plurality of pixels.

6. The image forming image method according to claim 4, further comprising deriving, based on a density of a pixel adjoining both sides of the target pixel in the sub scanning direction and a density of the target pixel, the density of the plurality of pixels after conversion of pseudo high resolution in the sub scanning direction corresponding to the target pixel.

* * * * *